US007539651B2

(12) United States Patent
Rozendaal et al.

(10) Patent No.: US 7,539,651 B2
(45) Date of Patent: May 26, 2009

(54) MAIL PRODUCTION SYSTEMS

(75) Inventors: Vincent Rozendaal, Essex (GB); Stephen Kelly, Hertfordshire (GB)

(73) Assignee: Pitney Bowes Ltd., Harlow (GB)

( * ) Notice: Subject to any disclaimer, the term of this patent is extended or adjusted under 35 U.S.C. 154(b) by 56 days.

(21) Appl. No.: 10/311,738

(22) PCT Filed: Jun. 12, 2001

(86) PCT No.: PCT/EP01/06658

§ 371 (c)(1),
(2), (4) Date: Oct. 20, 2003

(87) PCT Pub. No.: WO01/99055

PCT Pub. Date: Dec. 27, 2001

(65) Prior Publication Data

US 2004/0064423 A1    Apr. 1, 2004

(30) Foreign Application Priority Data

Jun. 19, 2000  (GB) ................................. 0015001.1

(51) Int. Cl.
*G06Q 99/00* (2006.01)
(52) U.S. Cl. ............................ 705/401; 705/1; 705/406; 705/408; 705/410
(58) Field of Classification Search .................... 705/1, 705/401, 402, 408, 406, 410; 700/220
See application file for complete search history.

(56) References Cited

U.S. PATENT DOCUMENTS

| | | | | |
|---|---|---|---|---|
| 4,246,643 A | * | 1/1981 | Hubbard ...................... | 101/91 |
| 4,302,821 A | * | 11/1981 | Eckert et al. ................ | 705/410 |
| 4,796,196 A | * | 1/1989 | Durst et al. .................. | 700/224 |
| 4,797,830 A | * | 1/1989 | Baggarly et al. ............ | 705/406 |
| 4,829,443 A | * | 5/1989 | Pintsov et al. ............... | 705/406 |
| 4,908,768 A | * | 3/1990 | Gelfer et al. ................. | 705/409 |
| 5,119,306 A | * | 6/1992 | Metelits et al. .............. | 705/406 |
| 5,177,687 A | * | 1/1993 | Baggarly et al. ............ | 705/406 |

(Continued)

FOREIGN PATENT DOCUMENTS

EP    0741374    11/1996

(Continued)

OTHER PUBLICATIONS

"Neopost: Neopost—Keeping You Posted at World of Despatch, 1998", Sep. 14, 1998, M2 Presswire, 2 pgs.*

(Continued)

*Primary Examiner*—John W Hayes
*Assistant Examiner*—Freda Nelson
(74) *Attorney, Agent, or Firm*—Steven J. Shapiro; Angelo N. Chaclas (57) ABSTRACT

A mail production system is described, the system comprising a mail finishing system for converting documents into finished items of mail ready for hand-over to a postal service, and a secure accounting system for generating accounting data relating to the items of mail produced by the mail finishing system, wherein the secure accounting system is able to generate signals to control operation of the mail finishing system. Specifically the secure accounting system is able to delay or stop operation of the mail finishing system. A corresponding method of producing mail is also described.

12 Claims, 5 Drawing Sheets

U.S. PATENT DOCUMENTS

| | | | |
|---|---|---|---|
| 5,200,903 A * | 4/1993 | Gilham | 705/408 |
| 5,628,249 A * | 5/1997 | Cordery et al. | 101/91 |
| 5,684,706 A * | 11/1997 | Harman et al. | 700/95 |
| 5,768,132 A * | 6/1998 | Cordery et al. | 705/410 |
| 5,826,247 A | 10/1998 | Pintsov et al. | |
| 6,026,385 A * | 2/2000 | Harvey et al. | 705/408 |
| 6,208,980 B1 * | 3/2001 | Kara | 705/408 |
| 6,741,971 B1 * | 5/2004 | Duval et al. | 705/401 |
| 6,816,838 B1 * | 11/2004 | Ryan, Jr. | 705/1 |
| 7,124,117 B1 * | 10/2006 | Girardi et al. | 705/401 |
| 2001/0032033 A1 * | 10/2001 | Krasuski et al. | 700/220 |

FOREIGN PATENT DOCUMENTS

| | | |
|---|---|---|
| EP | 0762336 | 3/1997 |
| EP | 814434 A2 * | 12/1997 |
| EP | 0903699 | 3/1999 |
| WO | 9857302 | 12/1998 |

OTHER PUBLICATIONS

Pavely, Richard, "The Mailroom", Jan. 1995, Office Systems. Mt. Airy, vol. 12, Iss. 1; p. 34, 4 pgs.*

Pavely, Richard, "Nifty Mail Center Software", Oct. 2000, AllBusiness.com, 3 pgs.*

* cited by examiner

Current Job #
                                    [    ]
                                                      ☐ Inkjet Enable
Select Action Codes

[_________________________________________▼]

┌─ Select All that Apply ─────────────────────────┐
│                                                 │
│ ☐ Print Text on Pieces with Scan Errors         │
│ ☐ Print Text on Damaged Pieces [Jams/Incomplete/Removed] │
│ ☐ Print Text on Overweight Pieces               │
│ ☐ Print Text on Directed Divert Pieces          │
│ ☐ Print Text on Diverted Pieces - Non Double Stoppage │
│ ☐ Print Text on All Pieces                      │
└─────────────────────────────────────────────────┘

| UPDATE | | EXIT |

MAIL PRODUCTION SYSTEMS

CROSS REFERENCE TO RELATED APPLICATIONS

This application is for entry into the U.S. national phase under §371 for International Application No. PCT/EP01/06658 having an international filing date of Jun. 12, 2001, and from which priority is claimed under all applicable sections of Title 35 of the United States Code including, but not limited to, Sections 120, 363 and 365(c), and which in turn claims priority under 35 USC §119 to Great Britain Patent Application No. 0015001.1 filed on Jun. 19, 2000.

TECHNICAL FIELD

The present invention relates to a mail production system comprising a mail finishing system for converting documents into finished items of mail ready for hand-over to a postal service and a secure accounting system for generating accounting data relating to the items of mail produced by the mail finishing system, and to corresponding methods of mail production.

BACKGROUND OF THE INVENTION

Conventionally, a mail finishing system, such as an inserter machine for inserting collations of documents into envelopes to create finished items of mail has been under control of an inserter system controller, which may form an integral part of the inserter machine. Data generated by the inserter system controller is passed to the secure accounting system so that the secure accounting system may generate accounting data relating to the items of mail produced by the mail finishing system. The data passed by the inserter system controller to the secure accounting system typically comprises information concerning the weight and postage value of items of mail generated by the mail finishing system, as well as the number of items of mail in a batch of mail. On the basis of this information, the secure accounting system maintains a record of postage value dispensed in relation to the items of mail generated by the mail finishing system. But there may be instances where the secure accounting system is unable to process the information received from the mail finishing system.

SUMMARY OF THE INVENTION

An object of the invention is to provide a mail production system in which failure of the secure accounting system to process information sufficiently rapidly from the mail finishing system can be accommodated.

Accordingly, in one aspect, the present invention provides a mail production system comprising: a mail finishing system for converting documents into finished items of mail ready for hand-over to a postal service, and a secure accounting system for generating accounting data relating to the items of mail produced by the mail finishing system, wherein the secure accounting system is operable to generate signals to control operation of the mail finishing system.

In a second aspect, the present invention provides a method of producing mail comprising converting documents into finished items of mail ready for hand-over to a postal service under control of a secure accounting system for generating accounting data relating to the items of mail thus produced.

BRIEF DESCRIPTION OF THE DRAWINGS

The features and advantages of the present invention will be better understood from the following description, given by way of example, in association with the accompanying drawings, in which.

DETAILED DESCRIPTION

In the drawings and in the following description, the mailer may also be referred to alternatively as a customer of the postal service.

Figure 1:
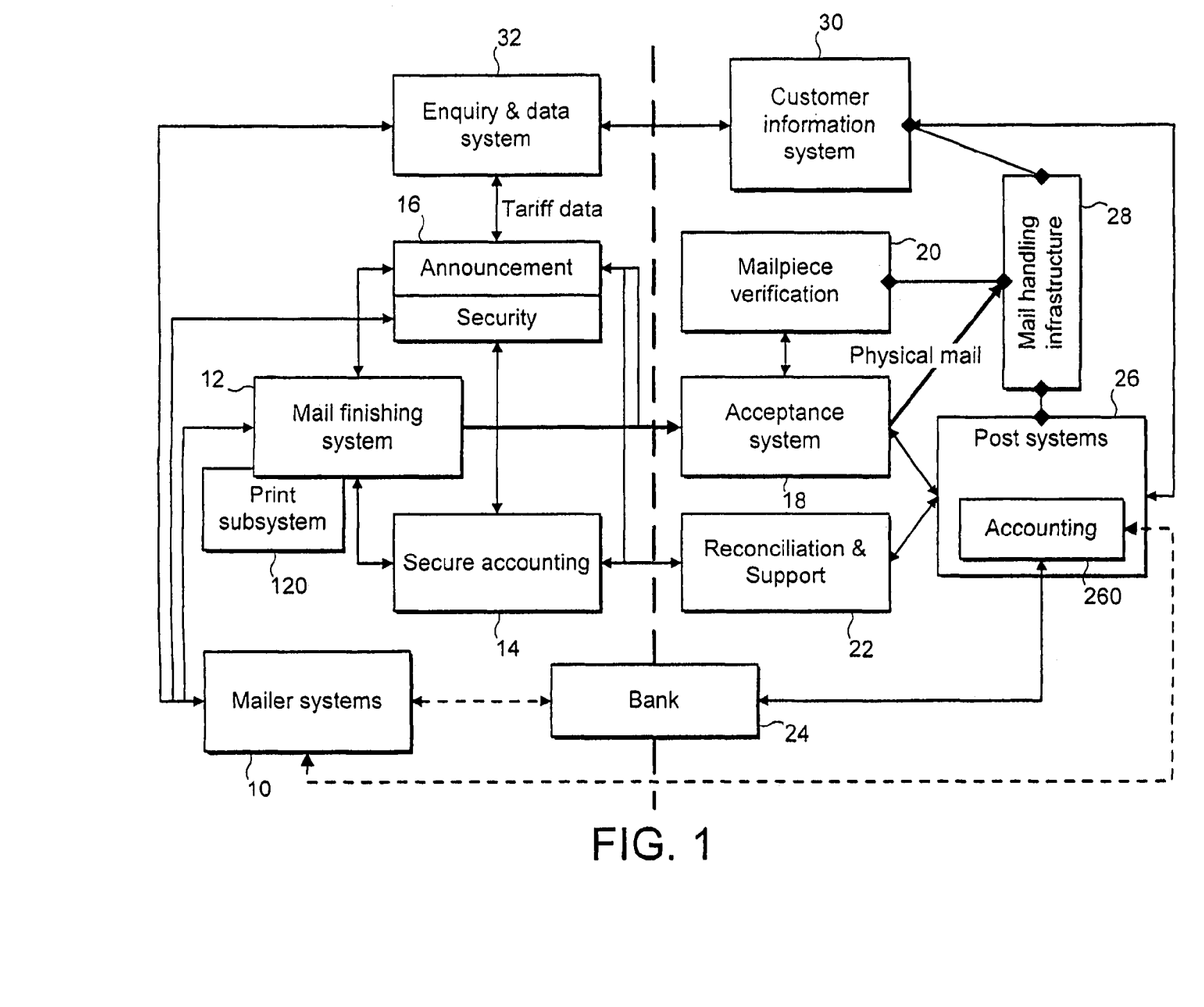
FIG. 1 schematically shows the component parts of a mailer-postal service interface.

A mailer-postal service interface may be represented schematically as shown in FIG. 1, in which the enumerated boxes represent functional components of the interface and the vertical dashed line down the centre of FIG. 1 divides functional components of the interface generally associated with the mailer (shown in the left-hand side of FIG. 1) from functional components of the interface generally associated with the postal service (shown in the right-hand side of FIG. 1).

The mailer-postal service interface shown in FIG. 1 is concerned with bulk volumes of mail, the hand-over of which from the mailer to the postal service is announced by means of a statement of mailing submission (SMS). An SMS is a message or document, from the mailer to the postal service describing the composition of a submission. The process of hand-over, of one or more submissions of mail, for acceptance by the postal service is called induction. Where several submissions are handed over as part of a single transaction, the set of submissions concerned is documented in a statement of induction (SoI). A statement of induction is a message which defines the set of submissions inducted into the postal system as part of a single hand-over transaction. A submission is part of a mailing which is inducted (possibly with submissions from other mailings) as a single unit. A mailing is a logical collection of mail, from the perspective of the mailer. Normally, a mailing will comprise mail which it is logical to generate as a unit and will be the unit for which the mailer expects to be invoiced. For physical production purposes, mailings may be broken down into one or more production batches. For induction purposes, on the other hand, they are broken down into submissions, with individual submissions being separately inducted. This may occur, for example, when the production of a mailing is spread over several days. Some postal services, however, may require each submission to be treated as a separate mailing, or may limit the number of submissions into which a mailing is split.

The functional components enumerated in FIG. 1 will now be described.

A mailer systems component 10 represents existing customer data processing systems, dealing with normal business functions including mail generation and company accounting. For example, such data processing systems include desktop computers running application programs for word processing and maintaining records and accounts.

A mail finishing system component 12 represents specialised equipment and control systems used for converting raw documents derived from the mailer systems 10 into finished mail, ready for hand-over to the postal service. Such equipment includes inserting, enveloping and addressing or labelling machines, postage metering equipment, bundling and wrapping equipment, etc.

The mail finishing system component 12 comprises a mail finishing print sub-system 120 which is responsible for the composition and printing of proof-of-payment indicia on mail items. It assembles data components required for a digital proof-of-payment mark to be added to mail items, encodes these in appropriate symbology and controls the process for the printing thereof on mail items.

A secure accounting system 14 is a trusted accounting device responsible for maintaining secure information and returning, to its controlling IT system, a digital signature for use in the authentication of postal payment indicia. At the end of each mail production run by the mailer, it also provides data and a cryptographic signature for a statement of mailing.

During a mail run the mail finishing system 12 passes postal rating information (e.g. the mail type and weight) to the secure accounting system 14. The secure accounting system supports payment security (encryption and authentication) requirements, maintains accounting information related to payments effected by the mailer, pre-paid or credit balance outstanding and unused payment tokens, returns a postage amount based on the requested input parameters, together with a digital signature of other payment evidencing token, and maintains a summary to mail piece types so that an SMS can be generated at the completion of the mail run.

To fulfil these functions, the secure accounting system 14 uses cryptographic techniques, based on design-specific algorithms and key management systems. It communicates with other devices and systems primarily through an announcement system 16, but may communicate directly with reconciliation and support systems 22 used for maintenance and re-crediting.

The secure accounting system 14 is responsible for controlling and interfacing with other components to ensure that the mail produced by the mailer is properly accounted for and provided with appropriate proof of payment in the form of digital indicia. Its main purpose is to complement the mailer and/or mail finishing systems 10, 12, as well as being for accounting for and printing the digital indicium onto each mail-piece. The announcement system 16, on the other hand is responsible for compilation of data for statements of mailing and the electronic submission of these to the postal service's acceptance system 18 and the processing of responses received from that system.

The acceptance system 18 supports the acceptance of mail into the postal service's mail handling environment and controls the hand-over of mail from the mailer to the postal service. This hand-over may take place either on the mailer's premises or in postal acceptance offices.

The acceptance system 18 accepts, records and acknowledges the arrival from mailers of statements of mailing. Data provided in each SMS are passed to the postal service's collections and other planning systems to support logistics optimisation, and to the mail-piece verification system 20 for revenue protection purposes.

The acceptance system 18 provides mail acceptance staff with an automated capability to authenticate incoming mail based on submitted statements of mailing. Where a mail submission can be reconciled with the SMS which describes it, the SMS is passed to the postal service's accounting system 260 for accounting verification, revenue reconciliation and, in the case of post-invoicing, invoicing purposes. Receipt and acceptance of the mail submission is acknowledged to the customer's announcement system 16.

If no reconciliation is possible, the acceptance system 18 informs the operator. When there is a justifiable suspicion that fraud has been attempted by the mailer, the acceptance system will assist in obtaining evidence of this.

The acceptance system 18 may also be used in the acceptance of mail submissions for which no statement of mailing has been submitted. In this case, data for validation is gained from sampling individual mail pieces.

The mail-piece verification system 20 processes and authenticates the payment evidence and/or customer identification provided by the indicium printed on each mail piece and collects information needed for accounting or accounting verification. In particular, it accepts data from individual mail pieces collected by the mail handling infrastructure, checks that such data presents acceptable evidence of payment for the services required, compares the data for consistency with information from the SMS, acknowledges to the acceptance system 18 the validity of the SMS involved, and passes data on payment evidence for payment management and fraud detection purposes to the acceptance system 18.

Reconciliation and support 22 is a collective name for a number of systems concerned with the management of postage accounting devices installed on the mailer's premises. Such systems provide re-setting services, i.e. services for the re-setting or re-crediting of postage payment devices, for example to the secure accounting system 4, and monitoring and maintenance services, i.e. services concerned with ensuring the functionality and reliability of postage payment devices and with detecting and preventing attempts to tamper with them. Again, these services concern primarily the secure accounting system 14.

The reconciliation and support systems 22 may be owned and operated either by a postal administration, or by a third party, working on behalf of the postal administration concerned.

The bank component 24 represents the means of effecting payment, normally through the commercial or postal banking system.

Post systems 26 represent the postal data processing infrastructure, including systems for customer account management and traditional accounting (bookkeeping) systems.

The mail handling infrastructure component 28 represents existing infrastructure for automated mail processing, including OCR and bar-code sorting machines, delivery sequencing equipment, etc. The process control systems used to manage this infrastructure are also included.

For present purposes, mail item data capture will come primarily from hand-held scanning devices associated directly with the verification system 20, rather than from the existing infrastructure.

The customer information system 30 is a system which supports the electronic reporting of, and access to, information on the acceptance and processing of the mailer's special category mail, the provision of postal information (both public and customer-contract specific) to assist the mailer in preparing mail for submission to the postal service, and the expression and recording of the mailer's preferences for the way mail is delivered to them.

The inquiry and data system 32 is the mailer's complement to the customer information system 30. It can be implemented using a standard worldwide web browser to access the customer information system 30.

In FIG. 1, physical mail follows the path represented by the bold arrow from mail finishing system 12 to acceptance system 18 and thence to mail handling infrastructure 28. Other arrows in FIG. 1 represents interchange of information relating to mail contents, including but not restricted to, for example, mail type and weight and accounting information and information for incorporation as part of the physical mail itself. Diamond-headed lines in FIG. 1. connecting component boxes 20, 26, 28 and 30 represent data integration conducted by the postal service.

Figure 2:
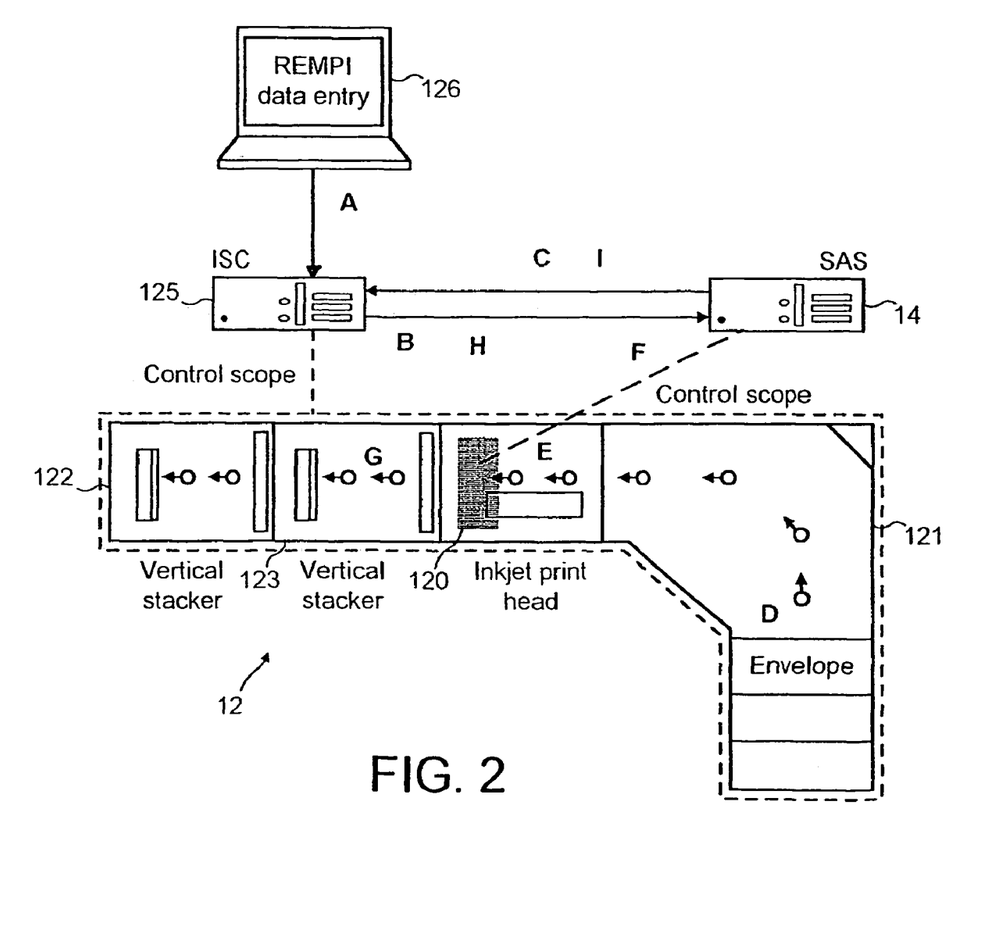
FIG. 2 shows a schematic plan view of the mail finishing system and secure accounting system of FIG. 1.

FIG. 2 shows more detail of the mail finishing system 12 of FIG. 1. An inserter machine 121 includes first and second vertical stackers 122 and 123 and an ink-jet print head 120 forming a print sub-system. An inserter system controller (ISC) 125 with a data entry station 126 provides control signals to the machine 121, as represented in FIG. 2 by the dashed line connecting ISC 125 with the dashed line enclosing inserter machine 121 in a lasso. The secure accounting system (SAS) 14 provides control signals only to the ink-jet print head 120 of the inserter machine 121, as represented in FIG. 2 by the dashed line connecting SAS 14 with the ink-jet print head 120. Bi-directional control signals pass between the ISC 125 and the SAS 14. This allows the SAS to issue control signals to the ISC to cause delay or stopping of the operation of the inserter 121. This may be necessary, for example, when the printer 120 is not ready in time to print on the appropriate mailpiece as it is fed downstream from the stackers 122 and 123.

FIG. 2 also represents the sequence of events during operation of the mail finishing system 12 be means of circled capital letters. Initially, a user of the mail finishing system enters job or mode-specific data to the ISC 125 via a graphical user interface providing appropriate screen displays (A). The ISC 125 downloads the job or mode-specific data and queries the SAS 14 as to the status of the ink-jet print head (B). The SAS 14 replies to the ISC 125 with the ink-jet print head device state (C). The ISC 125 then transmits mailpiece data for a specifically numbered item of mail to the inserter machine 120 (D). As an envelope advances in the direction represented by the arrowed circles in FIG. 2, the ISC 125 transmits/print/no print/specific print commands for the item of mail in question to the SAS 14, which accordingly controls the ink-jet print head 120 whenever print control is active to print on the item of mail in question to the SAS 14, which accordingly controls the ink-jet print head 120 whenever print control is active to print on the item of mail in question (E). The SAS 14 controls printing of an indicium on the item of mail (F) and sends a confirmation message to the ISC 125 for each item of mail thus printed, again if print control is active. If no confirmation message is received by the ISC 125, the ISC declares and/or logs an error (G). Eventually, after completion of the batch of mail items under production by the mail finishing system 12, the ISC 125 informs the SAS 14 of the end of the job run and provides a record of the processed mail to the SAS 14 for subsequent reconciliation of accounting data (H). As represented by (I), the SAS 14 may send unsolicited messages to the ISC 125 as necessary.

Figure 3:
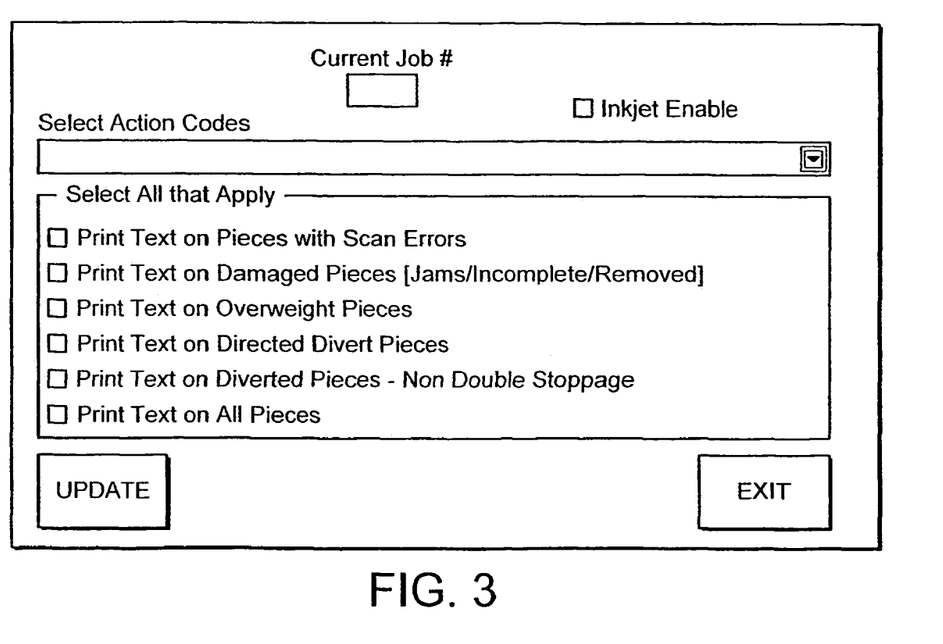
FIG. 3 shows a screen display of an inserter system controller.

FIG. 3 shows a screen display on the data entry terminal 126, showing how the user may select various control options by marking the appropriate box in a list of options.

Figure 4:
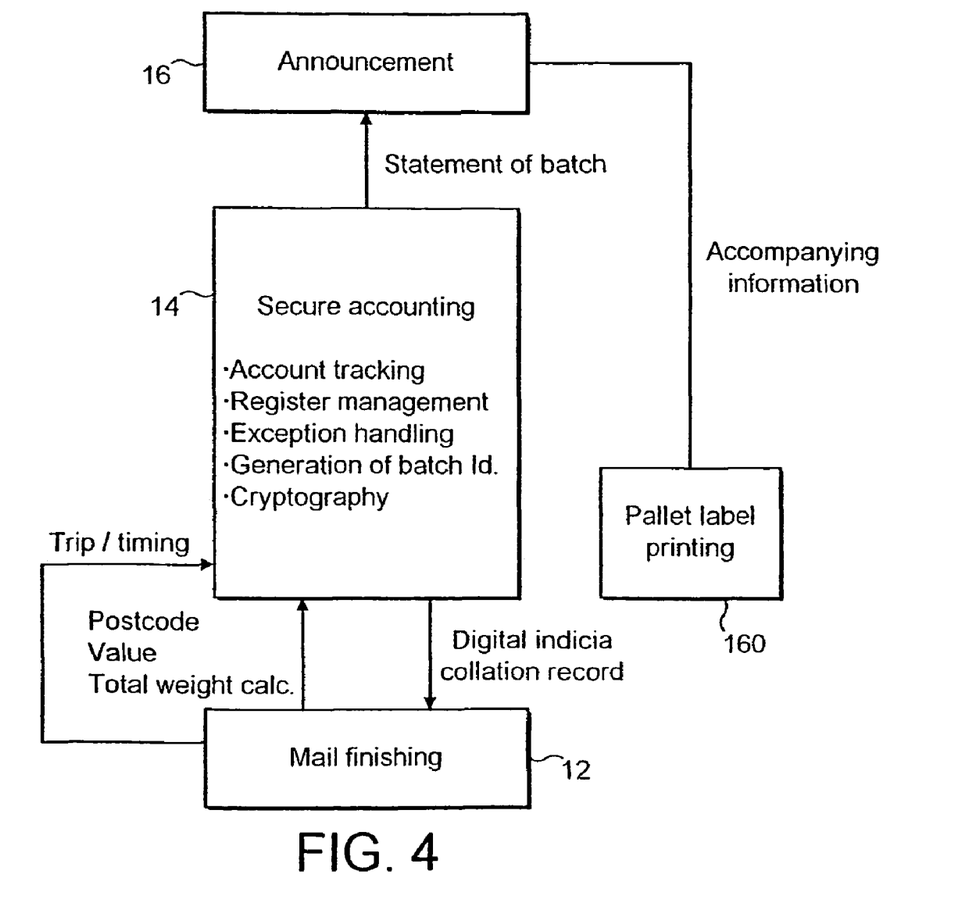
FIG. 4 shows the operational features of the secure accounting system 14 shown in FIG. 1.

FIG. 4 shows the operational features of the secure accounting system 14. The purposes of the accounting system 14 include to collect data for the announcement system 16 and to generate information for indicia to be printed on items of mail by print sub-system 120. Operation of the accounting system 14 is initiated by the mailer.

Inputs to the accounting system 14 include mail data from mailing machine 12. Outputs of the accounting system 14 include the statement of batch which is sent to announcement system 16 and data for creating postage indicia. This data is sent to print sub-system 120 of the mailing machine 12 so that it can print the postage indicia on items of mail. The results of these operations are secure measurement of the value of mail processed and control of data transferred to the announcement system 16.

The mail finishing print subsystem 120 resides on the mail finishing machine 12 and produces the indicia. Control for the print subsystem comes from the mail finishing machine 12 and data for the indicia is generated in the accounting system 14.

The accounting system 14 is used to monitor and report on mail ratings and compute total charges for a batch of mail or report on charges and discounts agreed with the postal service.

In the case of pre-payment, when a vault is used to store actual funds for dispersal on use, the accounting system 14 is intended to monitor the funds being dispensed. This account information is then reported to the internal accounts department of the mailer. This forms the account data included on the statement of mailing by the announcement system. In the case of pre-negotiated discounts this can be calculated and reported.

In the case where post-payment mail is being generated, the accounting system 14 monitors the number of pieces processed by the mail finishing machine 12 and this, in conjunction with the calculated postage, is submitted on the statement of mailing by the announcement system 16 to the postal service. An internal accounting report for the mailer is generated by the accounting system in line with the statement of mailing agreement generated by the postal service to agree with the submitted accounting figures. The batch Id is used to reconcile the statement of mailing with the statement of mailing agreement. Any invoices or account summaries then presented by the postal service must then use the batch Id to allow the mailer's internal systems to track the payment associated with the internal accounting report.

Where it is required, the accounting system can give the mailer the possibility to define an additional reference number according to his payment system.

The accounting system 14 can be further enhanced to include a data repository feature to monitor the postage meter usage and mailing-profiles of the mailer.

The accounting system 14 is able not only to receive data for accounting purposes and to control the timing of mail production and exception handling (which is described in greater detail below), but is also able to feed control signals back to the mail finishing systems 12 to cause the mail finishing systems to delay production of a batch of mail or to stop. This control of the mail finishing systems 12 by the secure accounting system 14 includes control of the print sub-system 120. These features allow that during certain instances when the accounting system 14 may need to take control of the mail finishing systems 12 or where the print sub-system 120 is not ready to print, the secure accounting system 14 can take control of operation of the mail finishing systems 12 including the print sub-system 120. Thus, for example, if the mail finishing systems 12 comprise a production mail machine, such as an inserter for inserting collations of documents into envelopes, which is under the control of an inserter system controller forming part of the mail finishing systems 12, the secure accounting system 14 takes control of the inserter system controller. In such a case, therefore, the insertion of further collations of documents into envelopes by the inserter and the franking of sealed envelopes containing collations of documents by the print sub-system 120 will be delayed or stopped by the secure accounting system 14 providing control signals to the inserter system controller.

The accounting system 14 may be physically located on the mailing machine 12. Possible further accounting system functions are as follows.

Account Tracking

This feature of the accounting system 14 tracks the mail rates being used by the mailer or the number of mail pieces being produced. The accounting system uses this information to provide summaries of the data to the announcement system 16. If postage metering is internal to the accounting system, it has full access to the metering information necessary to support this function. If, on the other hand, metering is external, the accounting system has to support account query messages to obtain the information from the meter. In the case of non-metered mail this feature tracks the number of pieces processed by the mail finishing machine 12 and accounts for mail based on the service selected by the mailer.

Register Management

This feature of the accounting system 14 refers to internal control of funds if an internal meter approach is pursued or the control of an external-metering device, if this is used to control the mail funds. This is only relevant in the case where postage is paid for before a franking impression is made on the envelope of an item of mail generated by mail finishing systems 12. In the case where postage is paid either on mail acceptance by the postal service or invoiced, account tracking takes precedence.

Exception Handling

This function of the accounting system 14 is used to monitor the functioning of the mail-finishing machine 12 and to report back to the announcement system 16 on outsorted mail pieces. This feature generates reports on metered mail that will not be entering the mail stream sent to the postal service, so that re-credit of funds can be carried out automatically. This also allows the mailer to be informed of mail items that require reprinting.

Generate Batch Id

This feature allows the accounting system 14 to take control of the batch number. It can use this identifier to make an impression on the envelope of an item of mail as part of the digital postal indicium it bears. Even if the batch number has been generated in the mailer systems 10, it will be entered into the accounting system 14 to allow internal tracking and control to be performed by the mailer.

Cryptography

This is a core element of the accounting system 14. It can be used to electronically sign data being generated in the accounting system 14 to ensure that any tampering of data will be evident to the postal service. It can also be used to either sign or produce a token to be placed on the digital postage indicium to validate a mail piece.

Figure 5:
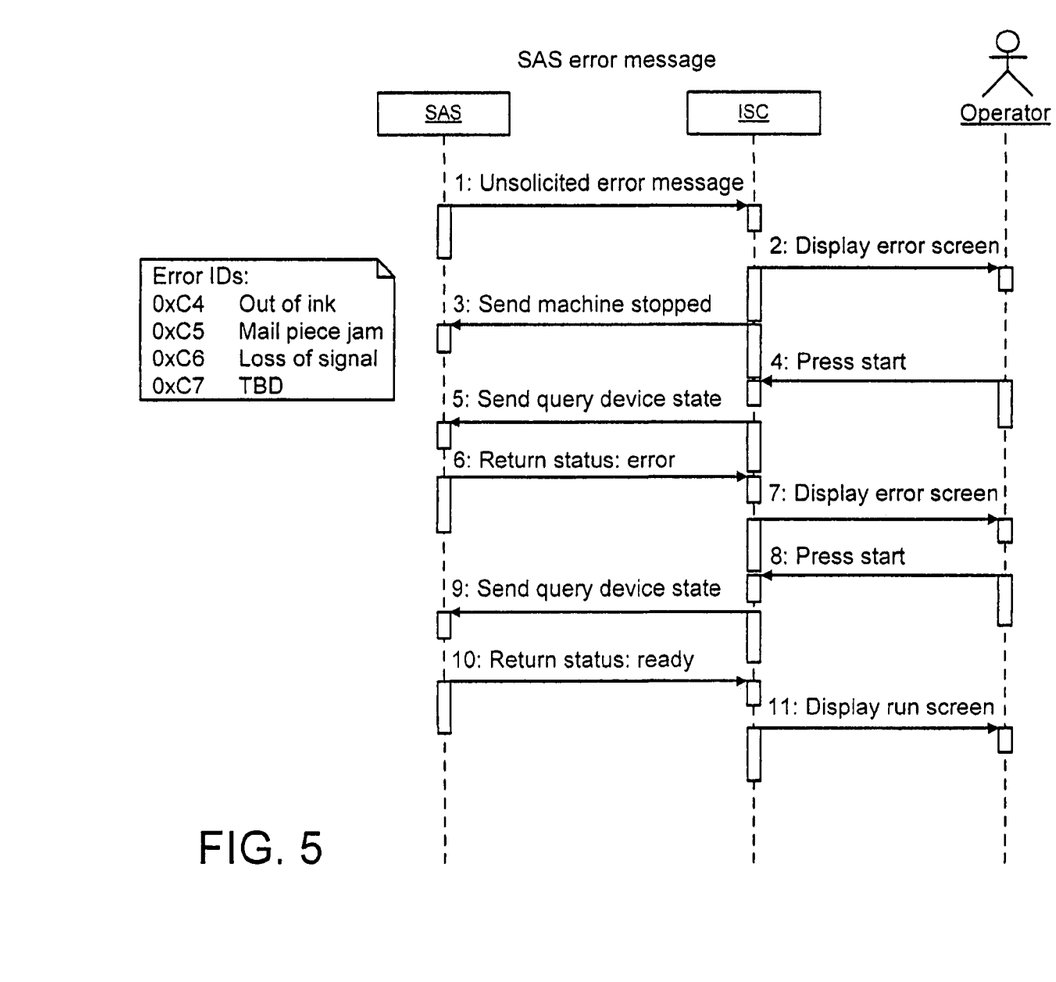
FIG. 5 shows a message flow between the secure accounting system and the inserter system controller of FIG. 2.

FIG. 5 shows in diagrammatic form the signal flow, in one possible operation mode, between the SAS 14, the ISC 125 and the operator terminal 126. It may seen how an unsolicited error message may be issued from the SAS 14 to the ISC 125, which will cause an error message to be displayed on the screen of terminal 126. The ISC responds with a message indicating that the machine is stopped. Upon receipt of a start signal from the operation, the ISC queries the SAS to determine the device state. If the error condition is uncleared, an error status signal is returned, again displayed to the operator. Upon re-trying to start the system, the operator causes a further status query to be sent to the SAS, which then responds with a "ready" signal. The run screen is then displayed to the operator.

The invention claimed is:

1. A mail production system comprising:
    a mail finishing system (12) for converting documents into finished items of mail ready for hand-over to a postal service, said mail finishing system having a print sub-system (120) and at least one stacker;
    a secure accounting system (14) for generating accounting data relating to the items of mail produced by the mail finishing system (12); and
    an inserter system controller (125) operatively connected to the mail finishing system (12) and to the secure accounting system (14), for at least control of said at least one stacker;
    wherein the secure accounting system directly controls the print sub-system (120) of the mail finishing system (12) and controls the overall operation of the mail finishing system (12) by communicating with the inserter system controller (125), which in turn controls the operation of the mail finishing system (12) pursuant to commands received from the secure accounting system (14).

2. A mail production system according to claim 1, wherein the print sub-system (120) is for applying a postage indicium to an item of mail produced by the mail finishing system (12) in accordance with the accounting data generated by the secure accounting system (14).

3. A mail production system according to claim 2, wherein the secure accounting system is able to delay or stop operation of the mail finishing system (12).

4. A mail production system according to claim 3, wherein the mail finishing system (12) comprises an inserter machine for inserting collations of documents into envelopes and the inserter system controller is for controlling said inserter during normal operation thereof, said secure accounting system (14) being able to override control of said inserter machine by said inserter system controller by providing control signals to said inserter system controller.

5. A mail production system according to claim 1, wherein the secure accounting system is able to delay or stop operation of the mail finishing system (12).

6. A mail production system according to claim 1, wherein the mail finishing system (12) comprises an inserter machine for inserting collations of documents into envelopes and the inserter system controller is for controlling said inserter during normal operation thereof, said secure accounting system (14) being able to override control of said inserter machine by said inserter system controller by providing control signals to said inserter system controller.

7. A method of producing mail comprising:
    converting documents into finished items of mail ready for hand-over to a postal service using a mail finishing system (12) having a print sub-system (120) and at least one stacker;
    generating accounting data relating to the items of mail produced by the mail finishing system (12) by use of a secure accounting system (14); and
    wherein the secure accounting system directly controls the print sub-system (120) of the mail finishing system (12), and controls the overall operation of the mail finishing system (12) by communicating with an inserter system controller (125) operatively connected to the mail finishing system (12) and to the secure accounting system (14), wherein the inserter system controller controls the operation of the mail finishing system (12) pursuant to commands received from the secure accounting system (14).

8. A method of producing mail according to claim 7, further comprising applying a postage indicium by the print subsystem to an item of mail being produced in accordance with the accounting data generated by the secure accounting system.

9. A method of producing mail according to claim 8, wherein control of the mail production by the secure accounting system includes delaying or stopping production of the items of mail.

10. A method of producing mail according to claim 9, wherein converting documents into finished items of mail comprises inserting said documents as collations into envelopes under control of the inserter system controller, normal operation of which can be overridden by said secure accounting system.

11. A method of producing mail according to claim 7, wherein control of the mail production by the secure accounting system includes delaying or stopping production of the items of mail.

12. A method of producing mail according to claim 7, wherein converting documents into finished items of mail comprises inserting said documents as collations into envelopes under control of the inserter system controller, normal operation of which can be overridden by said secure accounting system.

\* \* \* \* \*